April 1, 1930.  G. G. CREE  1,752,942
PROTECTION OF ELECTRIC SYSTEMS
Filed Feb. 9, 1928
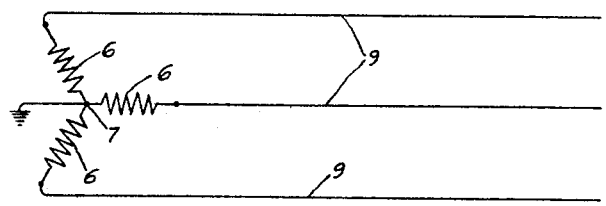
Fig.1.
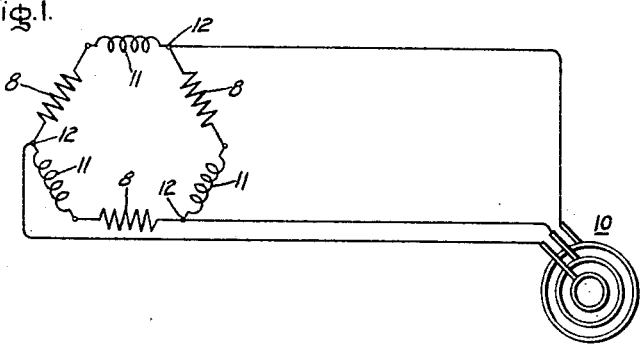
Fig.2.
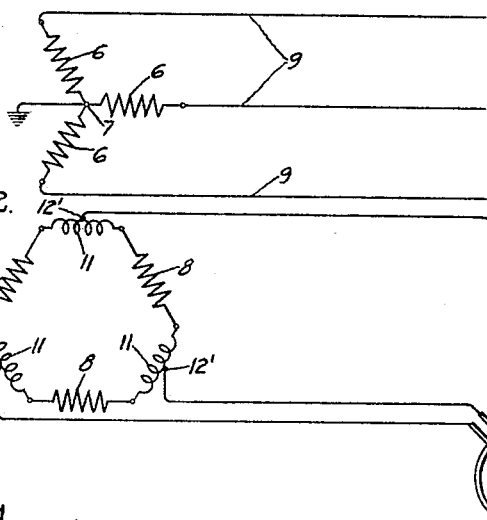
Fig.3.
Fig.4.
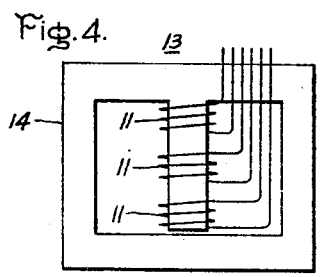
Fig.5.
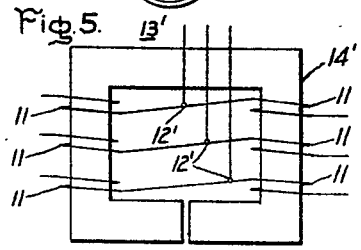
Inventor:
George. G. Cree
by Charles E. Tullar
His Attorney.

Patented Apr. 1, 1930

1,752,942

UNITED STATES PATENT OFFICE

GEORGE G. CREE, OF SCHENECTADY, NEW YORK, ASSIGNOR TO GENERAL ELECTRIC COMPANY, A CORPORATION OF NEW YORK

PROTECTION OF ELECTRIC SYSTEMS

Application filed February 9, 1928. Serial No. 253,180.

My invention relates to improvements in the protection of electric systems and more particularly to improved protective arrangements for limiting the current which tends to flow on the occurrence of abnormal conditions such as ground faults and an object of my invention is to provide an improved current limiting arrangement which is particularly adapted for the protection of electric systems having power transformers with a grounded neutral.

With the growth of interconnection in the electric utility field, enormous amounts of power are available to supply current on the occurrence of abnormal conditions such as ground faults. Such conditions frequently subject the electric apparatus of the system to severe electric stresses and also because of the lack of stability often result in an unnecessary falling out of step of synchronous apparatus by reason of the voltage drop accompanying the fault. Both are, in general, highly undesirable. Prior to this growth of interconnection, the individual systems, particularly those of high voltage, were often provided with transformers having a grounded neutral. With transformers used this way, the neutral is not usually insulated to withstand any considerable voltage to ground. It is, therefore, impractical and generally dangerous to insert any appreciable impedance directly in the neutral to ground connection of such transformers, particularly where they have been or are to be used on high voltage systems, such, for example as 100 kv. or more. In accordance with my invention, I provide a current limiting arrangement which is particularly adapted for a condition of this kind since it does not impose any serious voltage strain on the insulation of or adjacent the transformer neutral point. Moreover, in accordance with my invention the current limiting means may be magnetically independent of the transformer so that it is particularly adapted for polyphase transformer banks which are built up of single phase units.

My invention will be better understood from the following description when considered in connection with the accompanying drawing and its scope will be pointed out in the appended claims.

In the accompanying drawing, Fig. 1 illustrates diagrammatically an electric system embodying my invention; Figs. 2 and 3 illustrate diagrammatically modifications of my invention; Fig. 4 illustrates diagrammatically a current limiting means which may be used in carrying out my invention; and Fig. 5 illustrates another form of current limiting means which may also be used.

In Fig. 1, I have illustrated part of a polyphase electric system comprising a power transformer having a plurality of windings 6 connected to a common point 7 and a plurality of windings 8 respectively inductively associated with the windings 6 and connected in a closed circuit. As shown in Fig. 1, the system is three-phase, the high voltage windings 6 being connected in star and to supply phase conductors 9. The common or neutral point 7 is grounded. The low voltage windings 8 are connected in delta. These polygonal or delta connected transformer windings are connected to a circuit comprising a polyphase dynamo electric machine such as a generator 10.

In order to limit the fault current on the occurrence of a ground on the high voltage side of the system comprising the conductors 9, I provide in accordance with my invention an impedance device comprising a plurality of mutually inductively related windings 11 connected in series with the group of polyphase transformer windings 8 in such a manner that each phase of the circuit comprising the generator 10 has one of each of the windings 8 and 11 connected across it and in series with each other. As illustrated in Figs. 1 and 2 the inductive windings 11 and the transformer windings 8 are connected alternately in series in a closed circuit. In order normally to maintain the reactance of the impedance device substantially zero for alternating currents other than those due to leakage, the alternating current windings of the dynamo electric machine 10 are connected to corresponding points 12 in the closed circuit comprising the transformer windings 8 and the windings 11 of the impedance device. These points may be the connections between the transformer windings 8 and the reactance windings 11 taken in cyclic order around the closed circuit polygonal connection as shown in Fig. 1 or the midpoints 12' of the reactance windings as shown in Fig. 2.

For use in connection with the arrangement shown in Fig. 1, the impedance device may be of the type shown in Fig. 4. This device as illustrated is an iron core reactor 13 of the three legged type. On the middle leg of the core 14 are wound the windings 11, in such a manner that for any current which tends to flow in the same direction throughout the closed circuit comprising the transformer windings 8 and the reactance windings 11, the fluxes set up by these windings are additive. Since, however, the vector sum of the fundamental three-phase currents flowing in the transformer windings 8 is normally substantially zero, the resultant of the fluxes established by reason of these currents in the windings 11 is normally substantially zero. The magnetic circuit of the iron core 14 of the impedence device 13 may be provided with an air gap to increase the reluctance or other suitable means in order to control the impedance of the device. With the arrangment shown in Fig. 2 an impedance device 13' such as shown in Fig. 5 may be used. As illustrated, this device comprises an iron core 14' having two branches or legs on which each of the windings has half of its turns, midtaps being taken off as indicated at 12'. Here again the windings 11 are so related that for any current flowing in the same direction throughout the closed circuit, comprising the transformer windings 8 and the reactance windings 11, the fluxes set up by these windings are additive.

On the occurence of a ground fault on any one of the phase conductors 9 of the system, a current tends to flow in the closed circuit comprising the polygonally connected transformer windings 8. This current does not flow alike in all of the alternating current windings of the generator 9 but it does flow in the same direction in all of the mutually inductively related reactance windings 11. Consequently, they tend to produce a large flux in the core of the impedance device, this flux being limited only by the saturating characteristic of the core. Therefore, this current which tends to circulate in the delta connected windings 8 is opposed by a reactance which appears simultaneously with the fault current and limits the same accordingly as desired. The value of this reactance may be whatever is considered necessary for the stability and safety of the system and if desirable it may be proportioned in accordance with the disclosure in U. S. Letters Patent 1,537,371, May 12, 1925, to Waldemar Petersen assigned to the same assignee as this invention.

Under normal conditions the reactance of the windings 11 will be substantially zero since the vectorial sum of the polyphase currents is zero except on the occurrence of conditions under which current returns over paths other than those which conducted it out. Consequently, the vector sum of the fluxes in the windings 11 of the impedance device will be substantially zero and, therefore, offer no reactance to the normal flow of polyphase currents which flow alike in all the phases. This idea of no reactance normally is highly desirable in order to eliminate interference with the normal stability and regulation of the system and also to reduce to a minimum the electric losses inherent in impedance devices.

In the modification of my invention shown in Fig. 3, the electric system comprises a power transformer having a group of star connected windings 6 whose neutral is grounded, a group of star connected windings 16 and a group of delta connected windings 8 with which are alternately connected in series the windings 11 of an impedance device such, for example, as shown in Fig. 4. To corresponding points of this closed circuit of transformer and reactance windings, may be connected the alternating current windings of a dynamo electric machine such as a synchronous condenser 17 installed for power factor correction. Here again as in the embodiments of my invention shown in Figs. 1 and 2, a fault to ground on the power system will cause a current to tend to circulate in the closed circuit of the transformer and reactance windings 8 and 11 and thereby so to energize the reactance windings 11 as to produce a flux for limiting a ground fault current.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination with a transformer having windings connected in star with the neutral grounded and windings connected in delta, an impedance device comprising a plurality of mutually inductively related windings connected alternately in series with the delta connected windings.

2. In a polyphase electric system, a power transformer having a plurality of windings one terminal of each of which is connected to a common point and a plurality of co-operating polygonally connected windings, means for limiting the fault current on the side of the system having the windings connected to a common point on the occurrence of a ground fault thereon comprising an impedance device having a plurality of mutually inductively related windings connected alternately in series with the polygonally connected windings of the transformer, and a polyphase dynamo electric machine having its alternating current windings respectively connected to corresponding points in the circuit of said polygonally connected transformer windings and reactance windings whereby the reactance of the impedance device is substantially zero to alternating currents which flow alike in all phases of the dynamo electric machine.

3. In combination with a polyphase circuit and a transformer comprising a group of polyphase windings, means for limiting the flow of leakage current in said transformer comprising a plurality of mutually inductively related windings, said inductive windings and said group of transformer windings being connected in series with one of each across the respective phases of said circuit.

4. In combination with a polyphase circuit and a power transformer comprising a group of polyphase windings, means for limiting the flow of leakage current in said transformer comprising a plurality of mutually inductively related windings magnetically independent of the transformer, said inductive windings and said transformer windings being series connected with one of each across the respective phases of said circuit.

5. In combination with a transformer having a plurality of windings connected to a common point and a plurality of windings respectively associated with said first windings and connected in a closed circuit, an impedance device comprising a plurality of mutually inductively related windings magnetically independent of the transformer and respectively connected alternately in series with the windings in the closed circuit.

6. In a three-phase electric system having a grounded neutral, a power transformer having three star connected windings and three delta connected windings, and means for limiting the fault current on the star connected side of the system on the occurrence of a ground fault thereon comprising a reactance device having three mutually inductively releated windings connected in series with the delta connected windings of the transformer at the corners of the delta.

7. In combination with a potential transformer having star connected windings with the neutral grounded and windings connected in delta, a reactance device comprising a plurality of mutually inductively related windings connected in series with the delta connected windings at the corners of the delta, each arranged to provide a magnetic flux in the same direction on the occurrence of a ground fault on the star connected side of the transformer.

8. In a three-phase electric system having a grounded neutral, a power transformer having three star connected windings and three delta connected windings, means for limiting the fault current on the star connected side of the system on the occurrence of a ground fault thereon comprising a reactance device having three mutually inductively related windings connected in series with the delta connected windings of the transformer at the corners of the delta, and a three-phase dynamo electric machine having its alternating current windings respectively connected to the midpoints of said reactance windings whereby the reactance of the reactance device is substantially zero to alternating currents which flow alike in all three phases of the dynamo electric machine.

9. In a three-phase electric system, a power transformer having three high voltage windings connected in star with the neutral grounded and three low voltage windings connected in delta, a source of three-phase current connected to said low voltage windings, and means for limiting the fault current in the high voltage side of the system on the occurrence of a ground fault thereon comprising a reactance device having three mutually inductively related windings connected in series with the delta connected windings of the transformer at the corners of the delta.

10. In combination with a transformer having a plurality of windings one terminal of each of which is connected to a common point and a plurality of cooperating polygonally connected windings, an impedance device having a plurality of mutually inductively related windings connected alternately in series with the polygonally connected windings.

In witness whereof, I have hereunto set my hand this 8th day of February, 1928.

GEORGE G. CREE.